E. C. SHAW.
VEHICLE WHEEL RIM.
APPLICATION FILED MAY 25, 1907.
1,087,467.
Patented Feb. 17, 1914.
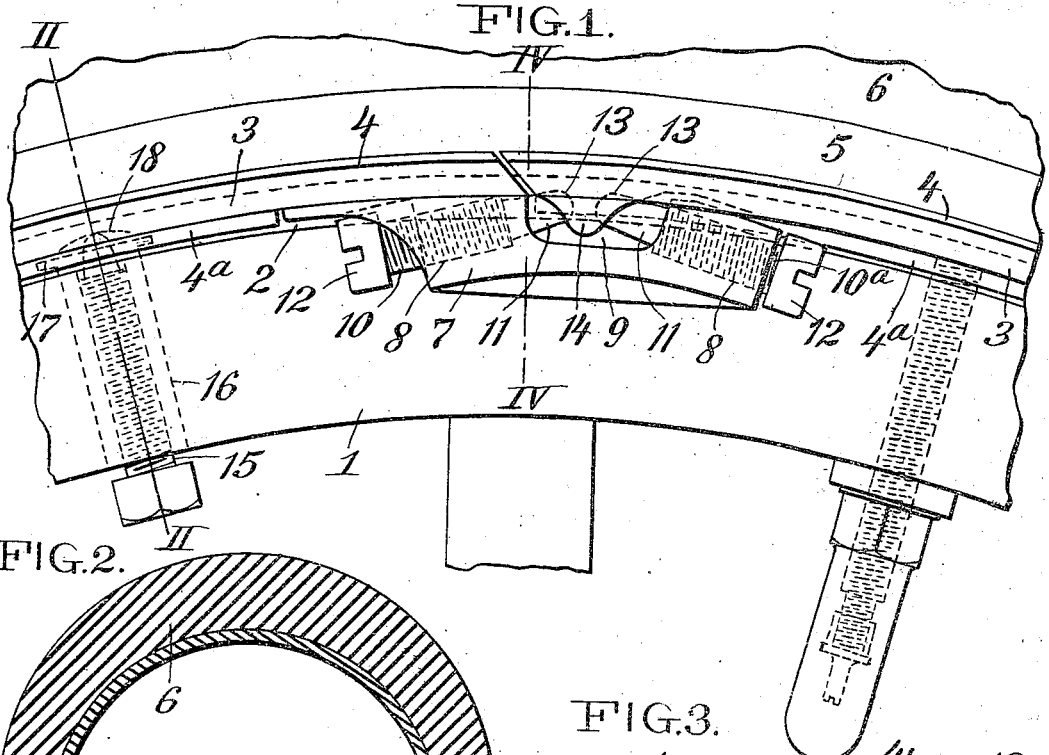
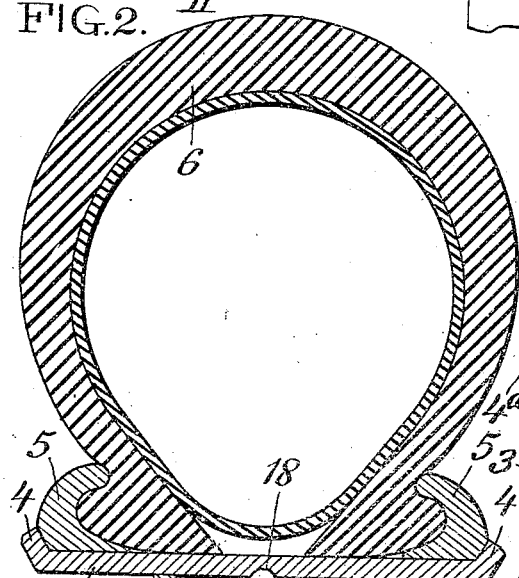
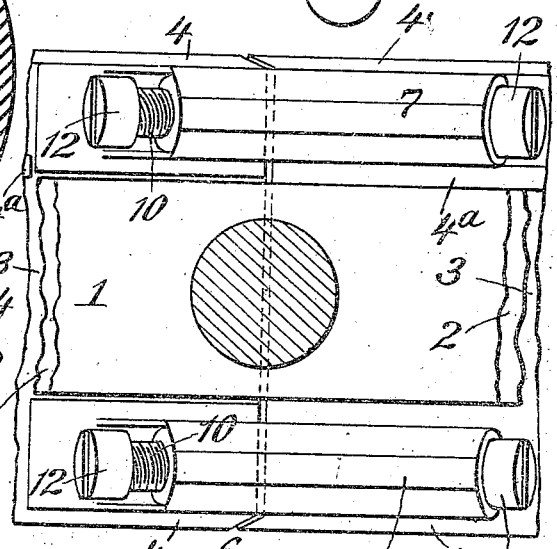
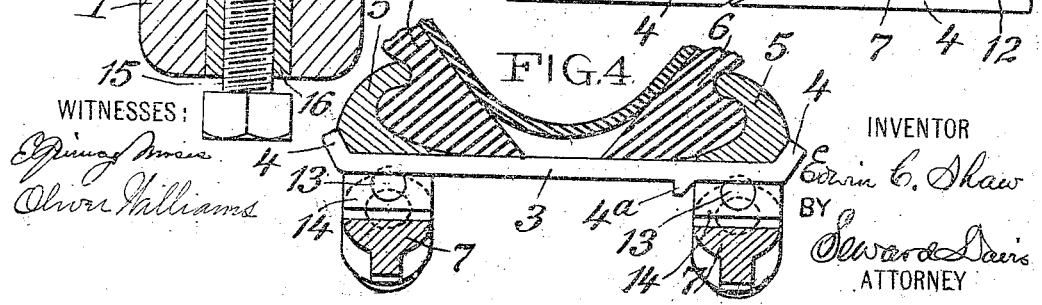
WITNESSES:
INVENTOR
Edwin C. Shaw
BY
Edward Davis
ATTORNEY

UNITED STATES PATENT OFFICE.

EDWIN COUPLAND SHAW, OF AKRON, OHIO, ASSIGNOR, BY MESNE ASSIGNMENTS, TO THE B. F. GOODRICH COMPANY, A CORPORATION OF NEW YORK.

VEHICLE WHEEL-RIM.

1,087,467.  Specification of Letters Patent.  Patented Feb. 17, 1914.

Application filed May 25, 1907. Serial No. 375,720.

*To all whom it may concern:*

Be it known that I, EDWIN COUPLAND SHAW, a citizen of the United States, residing at Akron, in the county of Summit and State of Ohio, have invented certain new and useful Improvements in Vehicle Wheel-Rims, of which the following is a specification.

This invention relates to vehicle wheel rims of that class in which one part of the rim is made detachable and is provided with means for carrying a tire. Rims of this character are especially adapted for use with pneumatic tires and one of my objects is to provide a detachable rim to which the tire may be applied while detached and inflated, a unitary structure thus being provided in which the tire and rim are securely held together and can be transported and applied to a wheel whenever desired. A considerable saving of time in changing a tire can thus be made, as the tire to be put on is already inflated and the application of the detachable rim to the wheel is a much simpler operation than the somewhat difficult process of applying a large and heavy pneumatic tire to the fixed rim of the old fashioned type.

This case presents a modification of the structures shown in my applications Serial Numbers 375,715 and 375,719, filed May 25, 1907, and of my Patent No. 971,318, dated September 27, 1910, in which applications and patent certain features present in the construction illustrated are claimed broadly.

In the drawings forming a part of this specification, Figure 1 is a side elevation of a portion of a rim and tire constructed according to my invention showing the means for connecting the ends of the split detachable rim, the valve stem, and one of the set screws which I may employ as a means for holding the detachable rim in place and illustrating a preferred embodiment of my invention. Fig. 2 is a cross section taken on line II—II of Fig. 1. Fig. 3 is a bottom plan view of the rim shown in Fig. 1, one of the wheel spokes being shown in section. Fig. 4 is a section of the foot of the tire and the detachable rim taken at line IV—IV of Fig. 1.

Like reference numerals are employed to indicate like parts throughout.

Referring to the drawings by reference numerals: 1 is the felly to which is fixedly attached in any suitable manner the fixed rim or felly band 2. The latter preferably has a substantially flat or cylindrical surface upon which seats the split detachable rim 3. As a matter of practical expediency, the central part of the surface of the felly band is preferably depressed slightly below the side portions thereof, which latter thus form the actual bearing surface upon which the split detachable rim seats. Such a depression is not essential, but facilitates the manufacture of the felly band, as it is not necessary with this structure to turn the felly band true throughout its entire width. A more even bearing of the detachable rim upon the cylindrical side portions of the felly band is assured and the danger of the detachable rim rusting to the felly band so tightly as to interfere with its ready removal is eliminated. The split detachable rim 3 is provided with a downwardly projecting flange 4ª adapted to bear against one edge of the fixed rim 2 to prevent lateral displacement of the detachable rim in one direction and is also provided with upstanding flanges 4 at its edges. Endless tire retaining flanges 5 adapted to engage the detachable rim are prevented from outward displacement by these upstanding flanges 4. These tire retaining flanges 5 may be of any suitable form depending upon the type of tire which it is desired to use. I have shown them as shaped to engage a clencher tire 6. The split detachable rim 3 may be contracted by lapping its ends past each other so that the tire and tire retaining flanges 5 may be passed over its upstanding flanges 4 as is necessary in applying or removing the tire. Means are provided for locking the ends of the detachable rim together and adjusting their relative position. In this modification these means consist of a pair of elongated lugs each adapted to be rigidly secured to, or integrally formed upon, one end of the detachable rim. Said lugs project beyond said end and are provided with a pair of oppositely inclined screw threaded sockets 8. Between the sockets, each of the lugs is provided with a transverse U shaped depression 9 in its upper face. Screws 10 and 10ª are adapted to be screwed into said sockets. These screws are provided with rounded or otherwise suitably formed inner ends 11 and with heads 12 adapted to be engaged by a wrench or screw driver. The other end of the detachable rim is provided with a pair of lugs 14 adapted to enter the depressions 9 in the screw carrying lugs 7. One of these lugs is adapted to be inserted between each pair of screws and may be provided with recesses 13 to be engaged by the rounded ends of the said screws. It will thus be seen that by screwing up one screw of the pair and unscrewing the other, it will be possible to move one end of the detachable rim with relation to the other end and to hold it in desired position.

The operation of the device is as follows: Supposing it to be desired to put a tire upon the detachable rim which has been removed from the fixed rim, the screws 10 and 10$^a$ are drawn apart sufficiently to release the lugs 14, whereupon the end of the rim carrying the lugs 7 is depressed so that the ends of the rim can be lapped past each other, thus reducing the diameter of the rim sufficiently to permit one of the retaining flanges 5 to be removed. The tire can now be readily slipped over the detachable rim and the flange 5 put back when the rim will be expanded and the lugs 14 set back into place. The screws 10 are now screwed up and the screws 10$^a$ withdrawn thus forcing the rim 3 in close and rigid engagement with the endless tire retaining flanges 5. The tire can now be inflated and the detachable rim and tire will be firmly fixed together. As the detachable rim is now expanded to its fullest diameter, it will readily slip over the fixed rim 2 until the flange 4$^a$ bears against the edge of the fixed rim, it being of course understood that the valve stem is first slipped through its proper opening in the fixed rim and felly. Screws 10 are now withdrawn slightly and screws 10$^a$ screwed in, thus drawing the ends of the detachable rim together until the detachable rim tightly clamps the fixed rim. The ends of the detachable rim need only be drawn together slightly to do this so that there will be no appreciable space between the detachable rim and the inside of the tire retaining flanges 5. To remove the detachable rim and tire the process is reversed. The frictional engagement of the detachable rim with the fixed rim is sufficient to hold it in place, but I may use additional locking means in the shape of set screws 15 carried in tubular nuts 16 passing through the felly and fixed rim. These nuts 16 are provided at their upper ends with annular flanges 17 adapted to seat in recesses in the fixed rim. The ends of the set screws engage shallow recesses 18 in the inner surfaces of the detachable rim. Any number of these set screws may be used though I prefer to use three, spaced equal distances apart. Cams or other equivalents for the screws may be used.

It will be obvious that when the split rim 3, carrying the inflated tire, is placed in position upon the felly band and the screws 10 withdrawn, the rim will be contracted upon the felly band with great force owing to the pressure of the air in the inflated tire. The contraction of the split rim upon the felly band is also greatly increased by the action of the endless flanges 5, which, as will be seen, have inclined outer faces bearing against the inclined faces of the flanges 4. The pressure of the air in the tire forces the endless rings or flanges 5 laterally, causing their inclined faces to wedge against the flanges 4. When the screws 10 have been sufficiently withdrawn, therefore, it will be seen that the split rim is firmly clamped upon the felly by the pressure of the air in the tire, this clamping effect being amply sufficient to hold the rim upon the felly during operation. The screws 10 are for the purpose of expanding the rim when it is to be removed, and also act to hold the rim in expanded position until it is placed upon the felly. After the rim has been contracted upon the felly by the air pressure, these screws 10 have completed their function and may, if desired, be entirely withdrawn from their sockets. I prefer, however, to leave them partly screwed into their sockets, as they do not interfere with the proper operation of the rim and they are thereby maintained in position for immediate operation when the rim is to be removed. While the pressure of the air in the tire is sufficient to contract the rim upon the felly and hold it firmly in place, as a matter of precaution I use the screws 10$^a$, which form auxiliary fastening means, these screws being forced into engagement with the lugs 14 after the split rim has been contracted upon it firmly by the air pressure. These screws do not interfere with the contraction of the rim under the influence of the air pressure in the tire, but prevent accidental expansion of the rim such as might occur, for instance, if the tire should become unintentionally deflated.

While I have shown and described one specific form of my invention as an illustration, it is not to be understood that I intend to limit myself to the precise embodiment or exact details set forth, but that modifications may be freely made so long as the essential and operative combination of elements is retained. For example, it will be understood that the means described and illustrated for expanding and contracting the rim may be applied to forms of split rims other than that shown and whether or not such rims are provided with separate endless tire-retaining flanges.

Having thus described my invention I claim:

1. In combination in a vehicle wheel, a fixed rim, a split detachable rim, an elongated lug carrying oppositely inclined screws projecting from one end of said detachable rim, and a lug projecting from the other end of said detachable rim adapted to be engaged by said screws.

2. In combination in a vehicle wheel, a fixed rim, a split detachable rim carrying tire engaging means, an elongated lug carrying reversely disposed screws projecting from one end of said detachable rim and a lug projecting from the other end of said detachable rim adapted to be engaged by said screws.

3. In combination in a vehicle wheel, a fixed rim, a split detachable rim, endless tire retaining flanges adapted to engage said detachable rim, one end of said detachable rim being provided with a pair of elongated lugs, oppositely inclined screw threaded sockets in each of said lugs, screws for said sockets, the other end of said detachable rim being provided with a pair of downwardly projecting lugs adapted to be engaged by said screws.

4. In combination in a vehicle wheel, a fixed rim, a split detachable rim, endless tire retaining flanges adapted to engage said split detachable rim, one end of said split detachable rim being provided with a pair of elongated lugs, each lug provided with a transverse depression in its upper face and with a pair of screw threaded sockets inclined from its ends upwardly toward the said depression, screws adapted to engage said sockets, the other end of said detachable rim being provided with downwardly projecting lugs, and depressions in said last named lugs adapted to be engaged by the inner ends of said screws.

5. In combination in a vehicle wheel, a fixed rim, a split detachable rim, a pair of screws carried by the detachable rim near one end thereof and each engaging an abutment on the other end of the rim, the screws facing in reverse directions, whereby when one screw is advanced the ends of the rim will be brought together and when the other screw is advanced the ends of the rim will be separated, 6. In combination in a vehicle wheel, a fixed rim, a split detachable rim carrying tire engaging means, a lug provided with a screw threaded hole therethrough on one end of said detachable rim, a set screw passing through said hole, an abutment on the other end of the detachable rim, the end of the set screw abutting against said abutment.

7. In combination with a wheel having a rim-seating surface, a detachable rim comprising a transversely split rim base capable of being secured in position on said rim-seating surface by contraction, said rim base having at one side thereof tire-retaining means, and having at the other side thereof an upturned edge portion forming a flange, the inner face of which is outwardly inclined, and a detachable annular tire-retaining flange seated upon said rim and engaging the outwardly inclined face of said flange on said split rim, said flange being adapted upon inflation of the tire to contract said rim.

8. In combination with a vehicle wheel, a split removable tire-carrying rim and means for contracting the rim upon the wheel and holding it contracted comprising a lug attached to one end of the rim and projecting beneath the other end thereof, a screw carried by the projecting portion of the lug, and an abutment on the end of the rim beneath which said lug projects, said abutment being engaged by the end of the screw nearest the split in the rim.

EDWIN COUPLAND SHAW.

Witnesses:
ARTHUR E. DAVISON,
WALKER K. MEANS.